(12) United States Patent
Yoo et al.

(10) Patent No.: US 11,448,784 B2
(45) Date of Patent: Sep. 20, 2022

(54) FULL WAVEFORM INVERSION USING TIME DELAYED SEISMIC DATA

(71) Applicant: Saudi Arabian Oil Company, Dhahran (SA)

(72) Inventors: Jewoo Yoo, Delft (NL); Roald van Borselen, Voorschoten (NL)

(73) Assignee: Saudi Arabian Oil Company, Dhahran (SA)

( * ) Notice: Subject to any disclaimer, the term of this patent is extended or adjusted under 35 U.S.C. 154(b) by 106 days.

(21) Appl. No.: 16/731,437

(22) Filed: Dec. 31, 2019

(65) Prior Publication Data
US 2021/0199827 A1    Jul. 1, 2021

(51) Int. Cl.
*G01V 1/28*    (2006.01)
*G01V 1/30*    (2006.01)

(52) U.S. Cl.
CPC .............. *G01V 1/282* (2013.01); *G01V 1/303* (2013.01); *G01V 2210/675* (2013.01)

(58) Field of Classification Search
CPC .......... G01V 1/282; G01V 1/303; G01V 1/34; G01V 1/306
See application file for complete search history.

(56) References Cited

U.S. PATENT DOCUMENTS

| 6,999,880 | B2 | 2/2006 | Lee |
| 9,075,159 | B2 * | 7/2015 | Washbourne ............ G01V 1/30 |
| 11,307,317 | B2 * | 4/2022 | Sun ........................ G01V 1/282 |
| 2016/0216389 | A1 | 7/2016 | Hu |
| 2019/0302293 | A1 * | 10/2019 | Zhang .................... G01V 1/303 |

FOREIGN PATENT DOCUMENTS

| CN | 111239806 | 6/2020 |
| GB | 2509223 | 6/2014 |
| WO | 2009002001 | 12/2008 |

OTHER PUBLICATIONS

Abubakar et al., "Three-dimensional seismic full-waveform inversion using the finite-difference contrast source inversion method," Geophysical Prospecting, vol. 59, Issue 5, 2011, 15 pages.

(Continued)

*Primary Examiner* — Bryan Bui
(74) *Attorney, Agent, or Firm* — Fish & Richardson P.C.

(57) ABSTRACT

Systems, methods, and apparatuses directed to determining a long wavelength velocity model using acquired seismic data lacking low-frequency data is disclosed. Determination of the long wavelength velocity model may include generating a time-delayed signal from the acquired seismic data to produce low-frequency information and reducing a residual energy between the time-delayed signal from the acquired seismic data and a time-delayed signal of modeled data using an objective function to produce an optimized initial velocity model using full waveform inversion. Moreover, a full waveform inversion on the optimized initial velocity model using acquired data can be used to produce a velocity model more accurately representing subterranean formations.

13 Claims, 8 Drawing Sheets

(56) References Cited

OTHER PUBLICATIONS

Kim et al, "3-D Seismic Imaging Using High-Performance Parallel Direct Solver for Large-Scale Finite Element Analysis," Proceedings of the Eighth International Conference on High-Performance Computing in Asia-Pacific Region, p. 187, Nov. 30-Dec. 3, 2005.
Luo et al., "Time-domain full waveform inversion using instantaneous phase information with damping," Journal Geophysical Engineering, vol. 15, 2018, 10 pages.
Mahrooqi et al, "Land seismic low frequencies: acquisition, processing and full wave inversion of 1.5-86 Hz," SEG Technical Program Expanded Abstracts, Society of Exploration Geophysicists, 2012, 5 pages.
Pan et al., "Recover low-frequency for full-waveform inversion via band-limited impedance inversion and projection onto convex sets," CREWES Research Report, vol. 27, 2015, 10 pages.
PCT International Search Report and Written Opinion in International Appln. No. PCT/KR2008/000792, dated May 29, 2008, 1 Page.
Pratt, "Seismic Waveform Inversion in the Frequency Domain, Part 1: Theory and Verification in A Physical Scale Model," Geophysics, vol. 64, No. 3, May 1999, pp. 888-901.
Shin et al, "Waveform inversion in the Laplace domain," Geophysical Journal International, vol. 173, Issue 3, 2008, 10 pages.
Shin et al, "Waveform inversion in the Laplace—Fourier domain," Geophysical Journal International, vol. 177, Issue 3, 2009, 13 pages.
Shin et al., "Comparison of waveform inversion, part 1: conventional wavefield vs logarithmic wavefield," Geophysical Prospecting, 2007, 55, pp. 449-464, 16 pages.
Sype et al, "Small-Signal Z-Domain Analysis of Digitally Controlled Converters," 2004 IEEE 35th Annual Power Electronics Specialists Conference, Jun. 20-25, 2004, vol. 21, pp. 470-478.
Virieux et al, "An overview of full-waveform inversion in exploration geophysics," Geophysics vol. 74, Issue 6, pp. WCC1-WCC26, Nov.-Dec. 2009, 26 pages.
Wu et al, "Seismic envelope inversion and modulation signal model," Geophysics vol. 79, Issue 3, May-Jun. 2014, 12 pages.
Xie, "Recover certain low-frequency information for full waveform inversion," SEG Houston 2013 Annual Meeting, 5 pages.
Dong et al., "Full waveform inversion with an amplitude increment coding-based data selection." Exploration Geophysics 52.2, Mar. 2021, 189-210, 23 pages.
Gao et al., "Full Waveform Inversion Algorithm Based on a Time-shift Nonlinear Operator." Society of Exploration Geophysicists, Technical Program Expanded Abstracts, 1297-1302, 6 pages.
PCT International Search Report and Written Opinion in International Appln. No. PCT/US/066401, dated Apr. 9, 2021, 16 pages.
Gulf Cooperation Council Examination Report issued in GCC Application No. 2020-41170, dated Oct. 26, 2021, 5 pages.

* cited by examiner

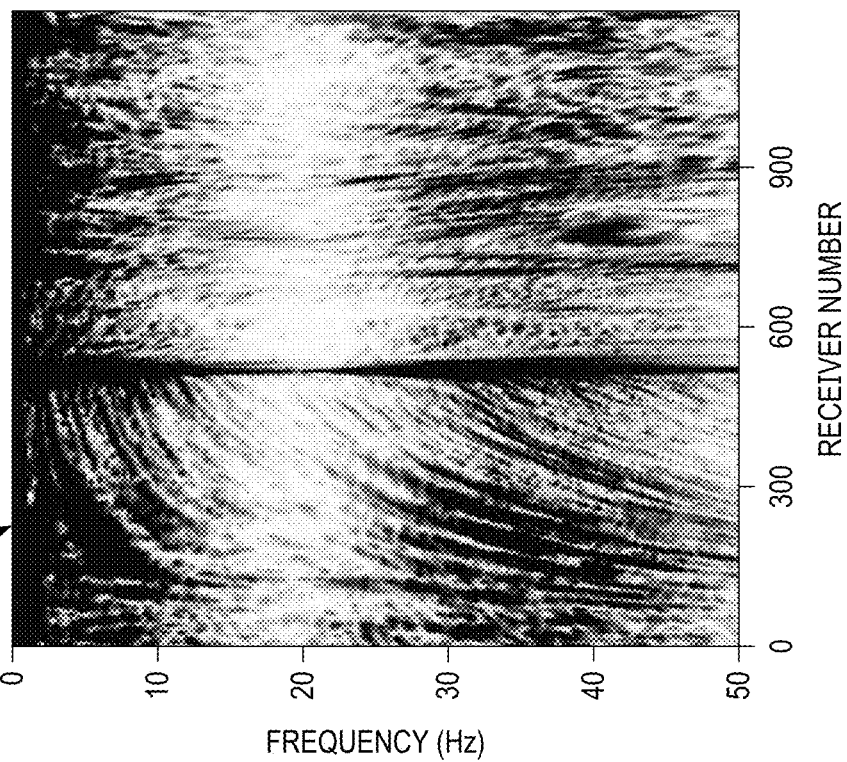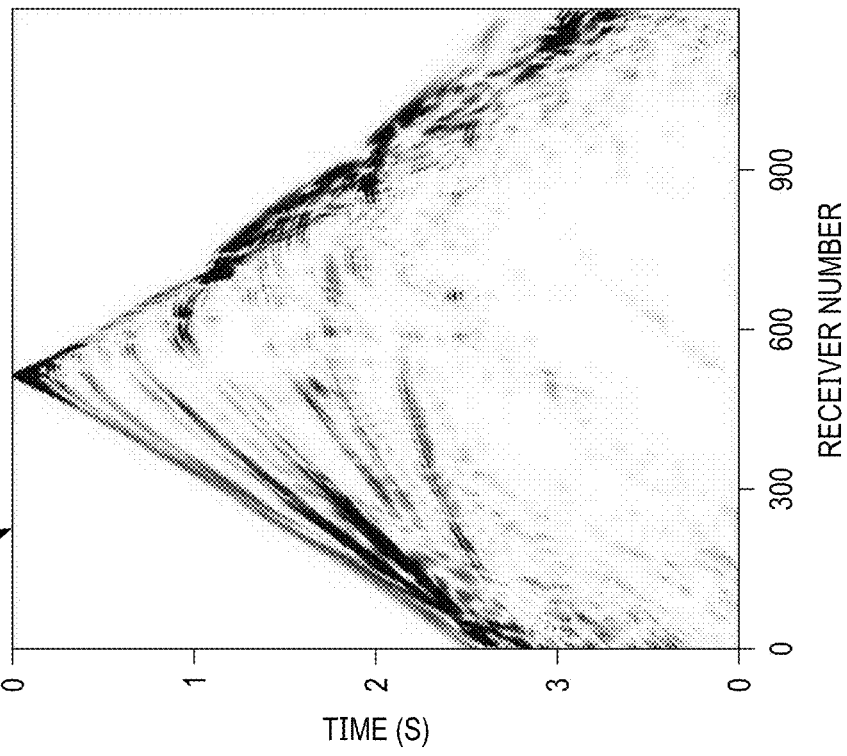

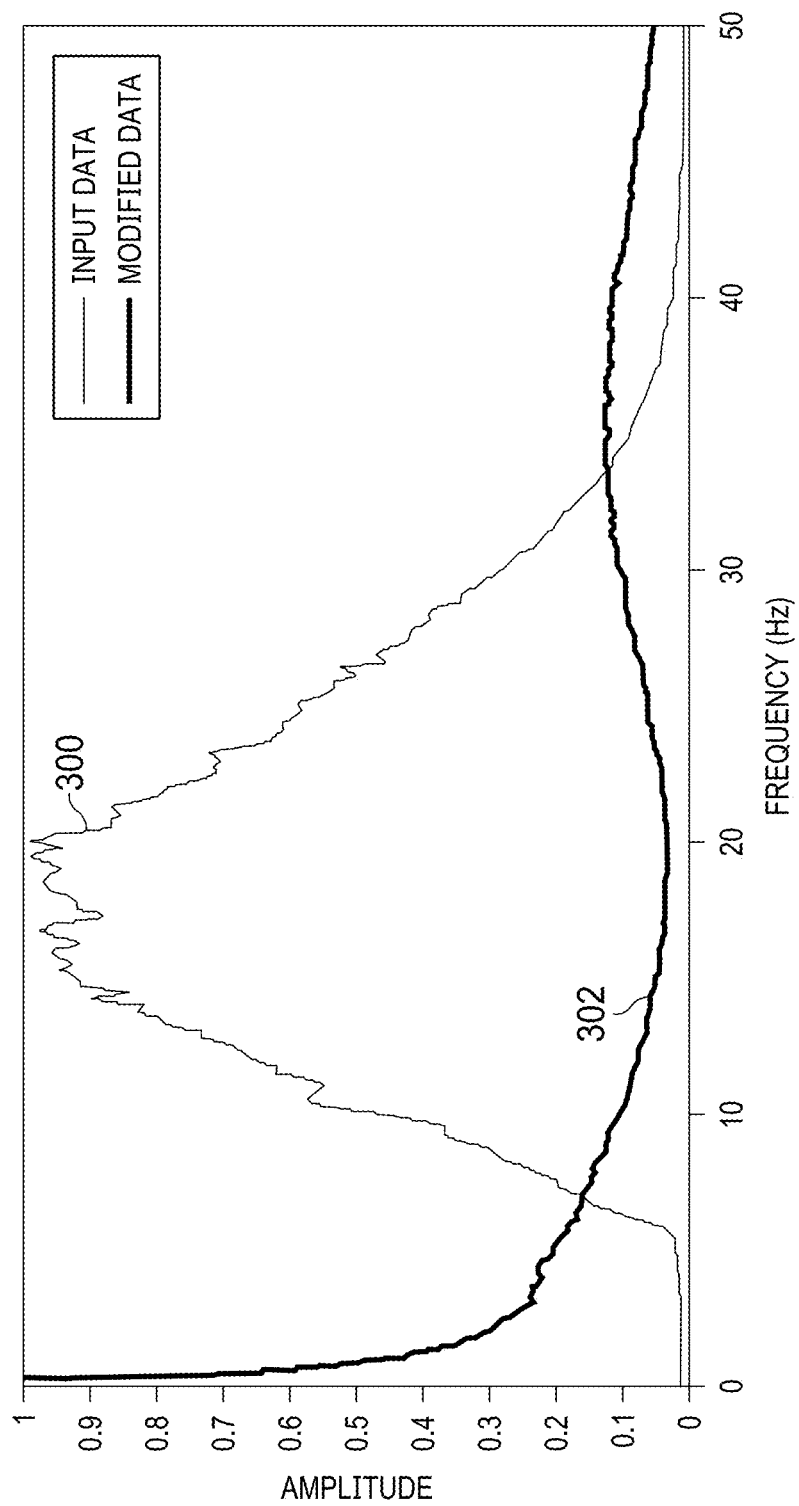

FULL WAVEFORM INVERSION USING TIME DELAYED SEISMIC DATA

TECHNICAL FIELD

This present disclosure relates to systems and methods for representing subterranean formations.

BACKGROUND

Full waveform inversion is a method for recovering subsurface velocity models using reduction of a residual energy between modeled data and acquired data. However, this method is susceptible to converging to local minima instead of a correct solution. By augmenting full waveform inversion with time delayed seismic data, it is possible to produce a velocity model more accurately representing subterranean formations.

SUMMARY

A first aspect of the present disclosure is directed to a computer program product encoded on a non-transitory medium. The product includes computer readable instructions for causing one or more processors to perform operations including receiving a set of observed seismic data; receiving an initial velocity model and an initial source wavelet, the initial velocity model being a user-selected velocity model and the initial source wavelet being a user-selected wavelet; performing a wavefield simulation using the initial source wavelet and the initial velocity model to generate modeled seismic data; converting the received set of observed seismic data into a first time-delayed signal; converting the modeled seismic data into a second time-delayed signal; optimizing the initial velocity model containing long wavelength subterranean formations using a full waveform inversion utilizing the first time-delayed signal and the second time-delayed signal; and performing a full waveform inversion utilizing observed data and modeled data on the optimized initial velocity model to produce a detailed velocity model that more accurately represents subterranean formations. In this field, a long wavelength velocity model is understood to indicate a smooth velocity model that does not show details but rather shows an overall representative value.

A second aspect of the present disclosure is directed to a computer implemented method performed by one or more processors for automatically generating a long wavelength velocity model that more accurately represents subterranean formations, the method comprising receiving a set of observed seismic data; receiving an initial velocity model and an initial source wavelet, the initial velocity model being a user-selected velocity model and the initial source being a user-selected wavelet; performing a wavefield simulation using the initial source wavelet and the initial velocity model to generate modeled seismic data; converting the received set of observed seismic data into a first time-delayed signal; converting the modeled seismic data into a second time-delayed signal; optimizing the initial velocity model containing long wavelength subterranean formations using a full waveform inversion utilizing the first time-delayed signal and the second time-delayed signal; and performing a full waveform inversion utilizing observed data and modeled data on the optimized initial velocity model to produce a detailed velocity model that more accurately represents subterranean formations.

A third aspect of the present disclosure is directed to an apparatus for generating a long wavelength velocity model that more accurately represents subterranean formations, the apparatus comprising one or more processors; and a non-transitory computer-readable storage medium coupled to the one or more processors and storing programming instructions for execution by the one or more processors, the programming instructions instruct the one or more processors to receive a set of observed seismic data; receive an initial velocity model and an initial source wavelet, the initial velocity model being a user-selected velocity model and the initial source wavelet being a user-selected wavelet; perform a wavefield simulation using the initial source wavelet and the initial velocity model to generate modeled seismic data; convert the received set of observed seismic data into a first time-delayed signal; convert modeled seismic data into a second time-delayed signal; optimize the initial velocity model containing long wavelength subterranean formations using full waveform inversion utilizing the first time-delayed signal and the second time-delayed signal; and performing a full waveform inversion utilizing observed data and modeled data on the optimized initial velocity model to produce a detailed velocity model that more accurately represents subterranean formations.

The various aspects may include one or more of the following features. Optimizing the initial velocity model utilizing the first time-delayed signal and the second time-delayed signal may include reducing a residual energy between the first time-delayed signal and the second time-delayed signal. Reducing a residual energy between the first time-delayed signal and the second time-delayed signal may include applying an objective function to the first time-delayed signal and the second time-delayed signal to determine the residual energy; determining whether the residual energy satisfies a predetermined condition; and, if the residual energy does not meet the predetermined condition, repeating an iterative loop until the occurrence of the predetermined condition or until a selected number of iterative loops is completed. The iterative loop may include taking a partial derivative of the objective function with respect to velocity to determine a directional change of the velocity; updating the initial velocity model according to the determined directional change of velocity to form a new velocity model; updating the initial source wavelet via a source estimation algorithm by minimizing a difference between a modeled green-function and the received set of observed seismic data to form a new source wavelet; performing a wavefield simulation with the new source wavelet and the new velocity model to generate new modeled seismic data; converting the received set of observed seismic data into a new first time-delayed signal; converting the new modeled seismic data into a new second time-delayed signal; applying the objective function to the new first time-delayed signal and the new second time-delayed signal to determine a new residual energy; and determining whether the new residual energy satisfies the predetermined condition.

The predetermined condition may include: a condition in which the residual energy is decreased to or less than a selected value; a condition in which the residual energy is no longer decreasing; or a condition in which a rate of decrease of the residual energy is at or less than a selected rate.

The source wavelet may be a Gaussian wavelet, a Ricker wavelet, or a first derivative of a Gaussian wavelet.

Performing a full waveform inversion on the initial velocity model may be used to produce an optimized initial velocity model containing long wavelength subterranean formations using modified acquired data and performing a full waveform inversion on the optimized initial velocity model using acquired data which may be used to produce a velocity model more accurately representing subterranean formations.

The various aspects may also include one or more of the following features. Programming instructions may exist for instructing the one or more processors to optimize the initial velocity model utilizing the first time-delayed signal and the second time-delayed signal may include programming instructions for instructing the one or more processor to reduce a residual energy between the first time-delayed signal and the second time-delayed signal. Programming instructions for instructing the one or more processors to reduce a residual energy between the first time-delayed signal and the second time-delayed signal may include programming instructions for instructing the one or more processors to apply an objective function to the first time-delayed signal and the second time-delayed signal to determine the residual energy; determine whether the residual energy satisfies a predetermined condition; and if the residual energy does not meet the predetermined condition, repeat an iterative loop until the occurrence of the predetermined condition or until a selected number of iterative loops is completed, the iterative loop comprising taking a partial derivative of the objective function with respect to velocity to determine a directional change of the velocity; updating the initial velocity model according to the determined directional change of velocity to form a new velocity model; updating the initial source wavelet via a source estimation algorithm by minimizing a difference between a modeled green-function and the received set of observed seismic data to form a new source wavelet; performing a wavefield simulation with the new source wavelet and the new velocity model to generate new modeled seismic data; converting the received set of observed seismic data into a new first time-delayed signal; converting the new modeled seismic data into a new second time-delayed signal; applying the objective function to the new first time-delayed signal and the new second time-delayed signal to determine a new residual energy; and determining whether the new residual energy satisfies the predetermined condition.

The predetermined condition may include a condition in which the residual energy is decreased to or less than a selected value; a condition in which the residual energy is no longer decreasing; or a condition in which a rate of decrease of the residual energy is at or less than a selected rate.

The source wavelet may be a Gaussian wavelet, a Ricker wavelet, or a first derivative of a Gaussian wavelet.

Programming instructions may also exist for instructing the one or more processors to perform a full waveform inversion to produce an optimized initial velocity model containing long wavelength subterranean formations using modified acquired data and performing a full waveform inversion on the optimized initial velocity model using acquired data to produce a velocity model more accurately representing subterranean formations.

The details of one or more embodiments of the present disclosure are set forth in the accompanying drawings and the description to follow. Other features, objects, and advantages of the present disclosure will be apparent from the description and drawings, and from the claims.

DESCRIPTION OF DRAWINGS

FIG. 2C is a time domain image of time-delayed data of the Marmousi model in which low-frequency information is obtained, according to some implementations of the present disclosure.

FIG. 2D is a frequency domain image of the time-delayed data of the Marmousi model in which low-frequency information is obtained, according to some implementations of the present disclosure.

FIG. 3 are frequency spectrum plots generated from the filtered Marmousi model data of FIG. 2A and the modified Marmousi model data of FIG. 2C.

Like reference symbols in the various drawings indicate like elements.

DETAILED DESCRIPTION

Figure 1:
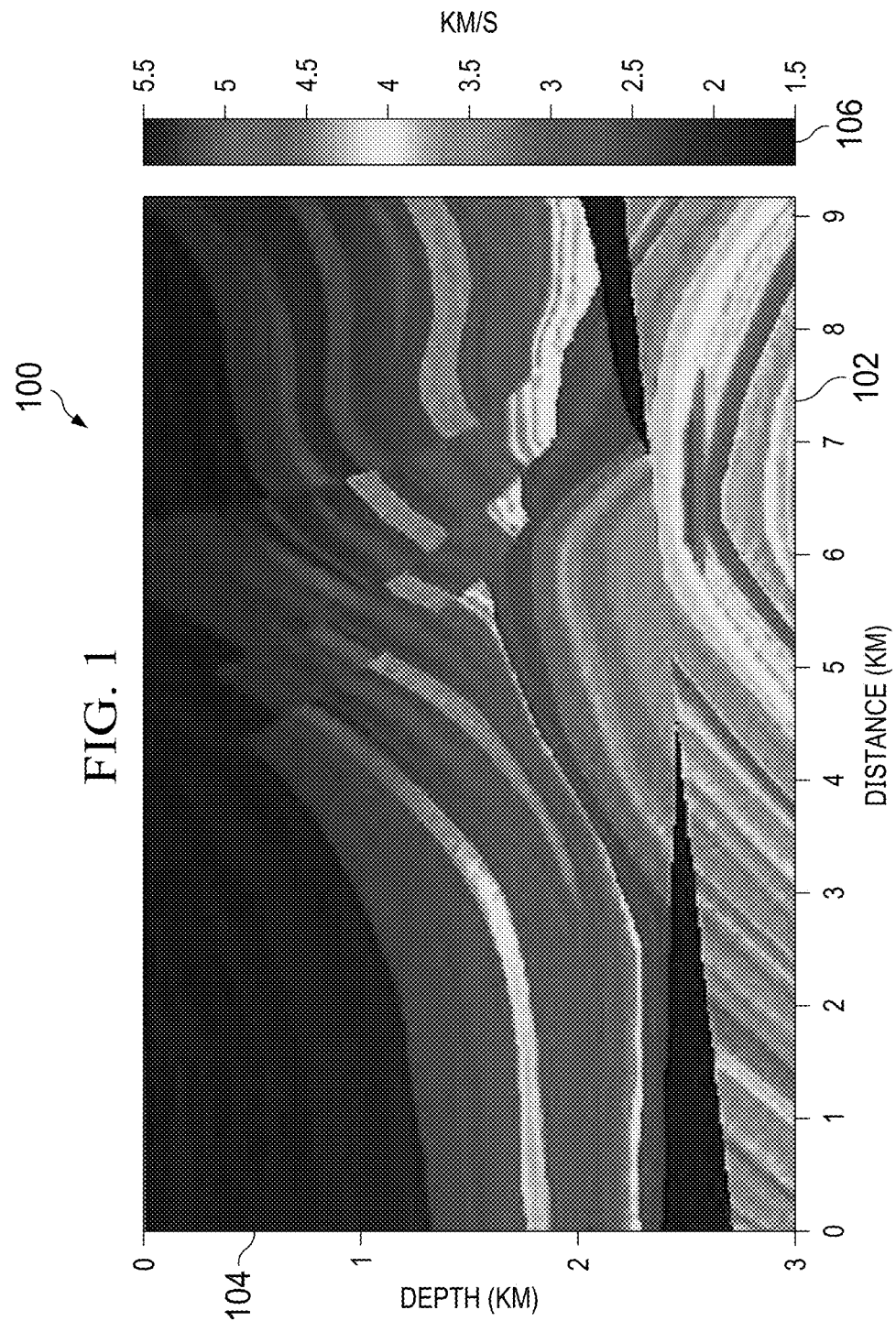
FIG. 1 is an image of the Marmousi model used as an example model to illustrate the features of the present disclosure.

For the purposes of promoting an understanding of the principles of the present disclosure, reference will now be made to the implementations illustrated in the drawings, and specific language will be used to describe the same. Nevertheless, no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, steps, or a combination of such described with respect to one implementation may be combined with the features, components, steps, or a combination of such described with respect to other implementations of the present disclosure.

The present disclosure is directed to systems and methods for performing a full waveform inversion of seismic data and, more particularly, to performing a full waveform inversion using time-delayed seismic data. Generally, acquired seismic data does not include seismic information less than or equal to one hertz (Hz)(referred to as "low-frequency information") due to the cost and technical limitations associated with acquiring seismic data at such low frequencies. In some implementations, low-frequency information is seismic information less than or equal to three hertz. Thus, a frequency range of approximately one hertz to three hertz may be used for the low-frequency information, but there is no limit on these values. However, in some instances, acquired seismic data may not include seismic information less than five hertz due to the cost and technical considerations (for example, seismic data acquisition geometry and the nature of the target formation) associated with acquiring seismic data at such low frequencies. In marine data acquisition, low-frequency information is diminished due to the seismic ghost reflection phenomena from the sea surface. As a result, low-frequency seismic data acquisition remains a challenge. Moreover, land-target seismic data acquisition for low-frequency is challenging. Vibro-seismic sources, commonly used in land acquisition, inject vibrations into the ground. However, current vibro-seismic sources are unable to generate vibrations at frequencies less than two hertz. Consequently, the frequency range of low-frequency information may vary depending on these and other factors. Thus, it is within the scope of the disclosure for the range of low-frequency information to extend beyond three hertz or be less than three hertz. For example, in some implementations, a range of low-frequency information may be within a range of one hertz to six hertz. In instances where a target site contains subterranean formations that requires low-frequency information less than approximately one hertz to be recovered using a full waveform inversion, the lack of the low-frequency information impairs the ability to generate a representative velocity model using full waveform inversion. Corresponding low-frequency information is needed in order to generate an accurate initial velocity model of subterranean formations that is subsequently used to perform a full waveform inversion. Particularly, low-frequency information is needed to generate a long wavelength velocity model that is subsequently used to perform the full waveform inversion. In some implementations, a long wavelength velocity model provides overall velocity trends within the subterranean while omitting details of subterranean formations.

To generate the low-frequency information, a time-delay signal is generated from the seismic data using the following equation:

$$d'(t) = \sqrt[l]{d(t)^2 + d(t-t_d)^2},$$  Equation 1 where d'(t) is a modified seismic signal for low-frequency; d(t) is the original seismic signal; $d(t-t_d)$ is the time-delayed seismic signal, and $t_d$ is a time-delay constant. The time-delay constant $t_d$ may be selected to be any desired value. For example, in some implementations, the time-delay constant $t_d$ may be selected to be a value within a range between zero and the recording time of the observed or measured seismic data, where the recording time of the observed or measured seismic data is the total recording time over which the seismic data is measured. This modified data produces low-frequency information, as discussed in more detail later, and can be used to generate an initial velocity model containing long wavelength subterranean formations using full waveform inversion. The optimized initial model containing long wavelength subterranean formations aids convergence to a correct subterranean velocity model using further full waveform inversion application and acquired data (for example, raw data) without low-frequency information. The generated low-frequency information is considered artificial since this data does not include meaningful information in the time domain. However, this low-frequency information is utilized to successfully generate an accurate long wavelength velocity model, as described in the present disclosure.

For illustration, Equation 1 is used to produce low-frequency information from acquired or modeled seismic data lacking low-frequency data (for example. seismic data with frequencies less than or equal to one hertz). In this example, modeled seismic data is generated using a time-domain finite difference method and the Marmousi velocity model, which is a known model of the North Quenguela trough in the Cuanza basin in northwestern Angola on the Atlantic Coast of West Africa. The Marmousi velocity model was created in 1988 by the Institut Français du Pétrole (IFP). FIG. 1 is an illustration of a plot 100 of the Marmousi velocity model. The plot 100 includes an x-axis 102 that represents a horizontal distance in kilometers (km) and a y-axis 104 that represents a depth in km. A scale 106 represents velocity in kilometers per second (km/s). In this instance, simulated data obtained using the Marmousi velocity model containing low-frequency information (that is, frequencies at less than or equal to six hertz). To illustrate the effectiveness of the systems and methods described in the present disclosure, a low-cut filter is applied to the simulated data obtained using the Marmousi velocity model to eliminate data less than or equal to six hertz to create a dataset without this low frequency information. The resulting data is referred to as the filtered simulated data.

Figure 2B:
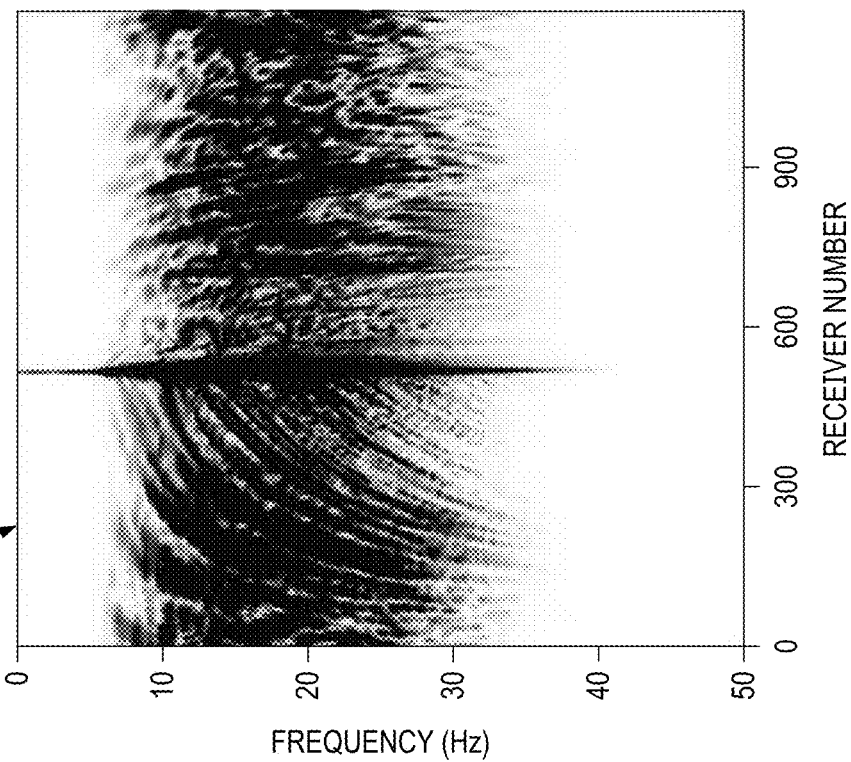
FIG. 2B is a frequency domain image of the filtered data of the Marmousi model with low-frequency information removed.
Figure 2A:
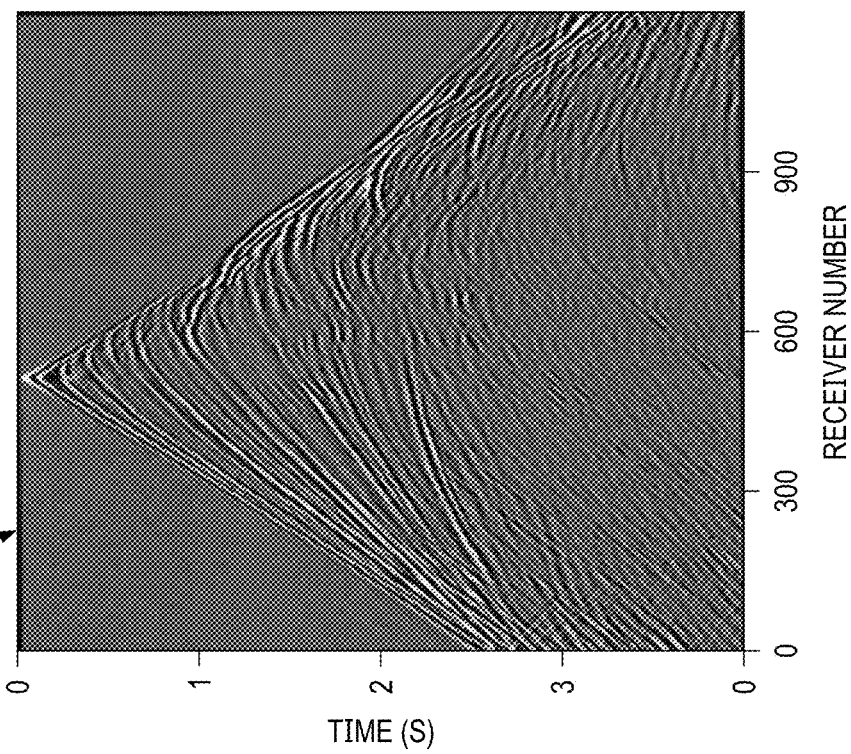
FIG. 2A is a time domain image of filtered data of the Marmousi model of FIG. 1 after application of a low-cut filter to remove low-frequency information.

FIGS. 2A and 2B show filtered simulated data 200 and 202 in the time domain (time unit of seconds or S) and the frequency domain (frequency unit of hertz or Hz), respectively, after the low-cut filter is applied. Equation 1 is applied to the filtered simulated model data to create modified simulated data that contains artificial low-frequency information. This modified simulated data 204 and 206 is shown in FIGS. 2C and 2D, respectively. FIG. 2C shows the modified simulated data in the time domain, and FIG. 2D shows the frequency spectrum of the modified simulated data. Comparison of FIGS. 2B and 2D shows that low-frequency information is present in the modified simulated data as a result of the time-delay signal generated by Equation 1. In this example, a value of one is used for the time delay constant, $t_d$. As indicated previously, other values for the time delay constant may be used.

FIG. 3 shows a graph 300 of the filtered Marmousi velocity model data and a graph 302 of the modified simulated data. As can be seen, graph 300 lacks low-frequency information less than or equal to six hertz, whereas graph 302 includes low-frequency data less than or equal to six hertz. Thus, Equation 1 successfully creates artificial low-frequency information from modeled or acquired seismic data lacking low-frequency information.

Figure 4:
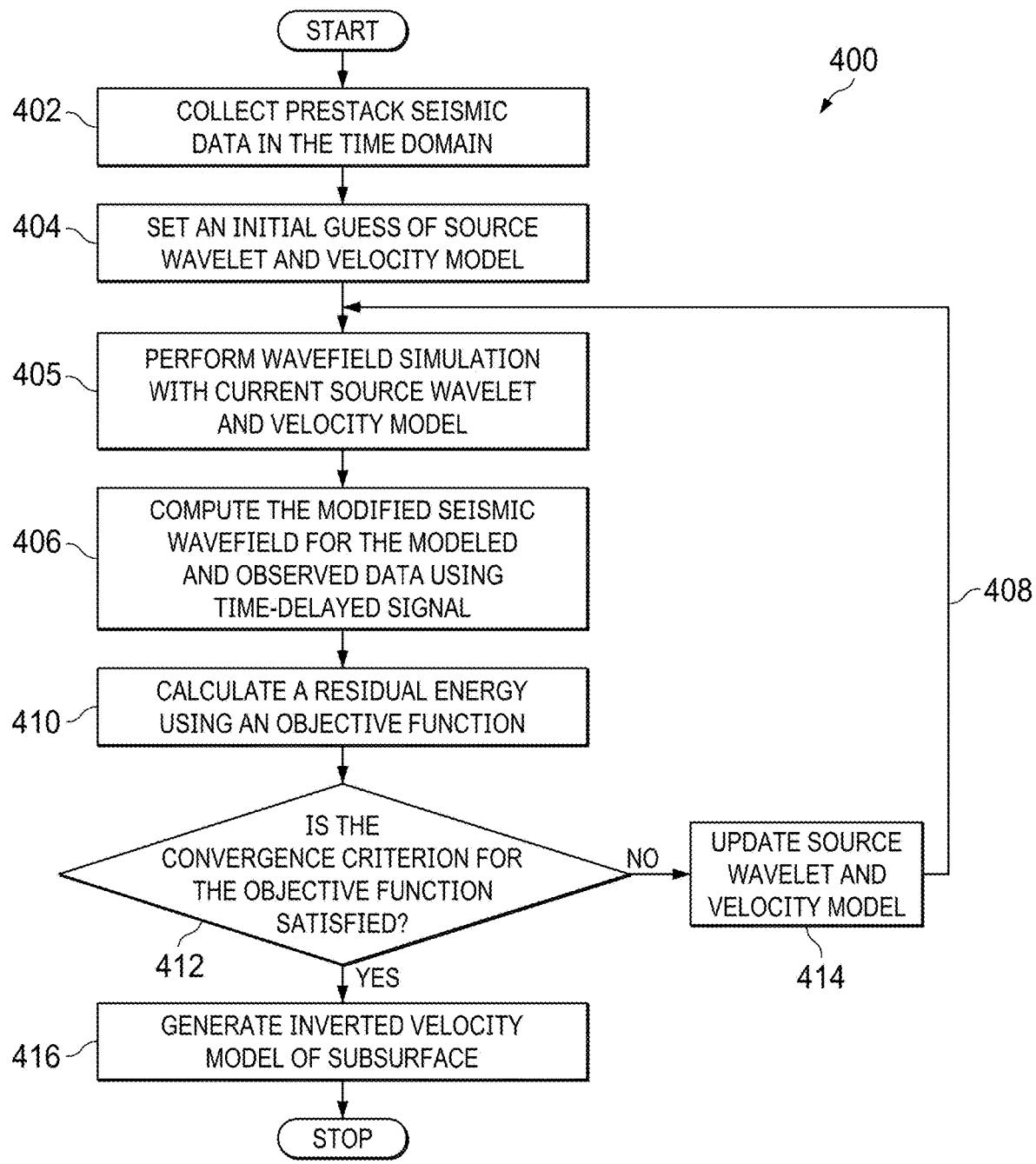
FIG. 4 is flowchart of an example method of generating a long wavelength velocity model, or optimized starting velocity model, using a full waveform inversion of according to some implementations of the present disclosure.

With modified seismic data containing artificial low-frequency information obtained using Equation 1, an optimized initial velocity model containing long wavelength subterranean formations is generated using a full waveform inversion and the modified data. A full waveform inversion is an iterative approach that reduces residual energy between modeled and observed seismic data by updating a velocity model and a source wavelet. FIG. 4 is a flowchart of an example method 400 of this iterative approach to generate an optimized initial velocity model using the modified data.

In the example described earlier, the modified data is modeled data and is, therefore, not acquired data. The following description describes both a modeled wavefield and observed seismic data (also referred to as acquired seismic data). For the purposes of this example, while the term "acquired data" is used, this term actually describes simulated data taken obtained using the Marmousi velocity model. Furthermore, the term "modeled data" represents simulated data obtained from an initial velocity model or updated velocity model. In real-world examples, the acquired data is actual field-measured data.

At 402, pre-stack seismic data is collected (in other words, acquired) in the time domain. At 404, an initial velocity model and an associated initial source wavelet are selected. Modeled seismic data is a synthesized dataset for a given velocity obtained using computer simulation. The initial velocity model may be generated from well log data or conventional seismic velocity analysis using observed seismic data. A starting velocity model and source wavelet are selected as an initial input and, during the course of an iterative loop, the velocity model and source wavelet are updated and optimized to produce a velocity model that would produce the acquired seismic data. Although the starting velocity model and source wavelet may be any initial velocity model and any initial source wavelet, full waveform inversion produces a more accurate result using fewer computational resource when a more accurate the velocity model and source wavelet are used. Therefore, for full waveform inversion, a source wavelet similar to the actual source wavelet is desired. However, the actual source wavelet is generally not available. Therefore, the source wavelet, also referred to as an inverted source wavelet, is recovered based on a difference between the modeled seismic data and the acquired data. In generating the inverted source wavelet, modeled seismic data corresponding to the acquired data is used along with the acquired seismic data. As an initial input to being an iterative process of determining the inverted source wavelet and an inverted velocity model, an initial source wavelet is used. The initial source wavelet may be any desired wavelet, as this initial source wavelet is used during a single iterative loop, described in more detail to follow. For example, in some instances, the initial source wavelet may be a Ricker wavelet.

The initial source wavelet corresponds to a delta function. However, use of a delta function in time domain modeling is not practical as a result of discretized sampling rates. Therefore, an arbitrary wavelet is used as the initial source wavelet, and this arbitrary wavelet is updated during the course of the method 400. Thus, the initial source wavelet is used once and that use occurs during a first iteration of an iterative process described later. Thereafter, the updated wavelet is used. This process represents a source estimation process during the first iterative loop and is refined in subsequent iterative loops. At each step in the iterative process, the wavelet and velocity model are updated. In a subsequent iterative step, the updated wavelet and velocity model are used. This process continues for each step in the iterative process to update and refine the wavelet. At the conclusion of the iterative process, the resulting updated wavelet corresponds to inverted source wavelet. Thus, the inverted source wavelet is a computed wavelet that corresponds to a wavelet that would generate the modeled seismic data similar to the acquired data. This initial velocity model is also refined through an iterative process described later. The refined initial velocity model represents a long wavelength velocity model that is then used as a starting model in a full waveform inversion.

At 405, a wavefield simulation is performed with the current source wavelet and velocity model. A wavefield simulation involves generating modeled seismic data from the velocity model and source wavelet. The modeled seismic data is simulated data obtained using a given velocity model and source wavelet, and the observed data is measured data acquired in the field. Thus, the modeled seismic data is obtained using the velocity model, whether the initial velocity model or an updated velocity model, and the observed data is obtained from the acquired data, and the wavelet, whether the initial source wavelet or an updated source wavelet. At each iterative step 405, modeled seismic data is simulated using the current velocity model and source wavelet. For example, in the first iterative step, the initial velocity model and initial source wavelet is used. For subsequent iterative steps, the updated velocity model and updated source wavelet from the immediately preceding iterative step are used.

At 406, a modification using a time delay is applied to the acquired pre-stack seismic data and to the modeled seismic data obtained from the velocity model and source wavelet of the current iteration cycle. Application of the time delay to the modeled seismic data and the acquired pre-stack seismic data introduces low-frequency information into the respective data sets. Additionally, the time-delayed simulation results may be further enhanced beyond modification using the time delay. Particularly, time-delayed simulation results may be further enhanced by convolving the simulation results using a selected synthetic wavelet. For example, the time-delayed simulation results and the time-delayed pre-stack seismic data may be convolved using a Ricker wavelet having a selected dominant frequency, for example, a 15 hertz frequency or a 5 hertz frequency. Other dominant frequencies may be used. The convolution process further enhances low-frequency information within the data sets. Furthermore, selection of the synthetic wavelet applied to the data sets in the convolution process may be selected to enhance a desired frequency or range of frequencies within time-delayed simulation results. Thus, the convolution process is usable as a frequency selection strategy for the full waveform inversion. The convolved wavelet is given a parameter defined by a user, and that parameter remains unchanged throughout the iterative process.

As a result, at 406, time-delayed modeled seismic data and time-delayed observed seismic data are computed using Equation 1. For each iterative loop 408, the source wavelet and velocity model become more refined to produce a simulated result that approaches the acquired seismic data. The acquired pre-stack seismic data itself lacks low-frequency information. Therefore, Equation 1 is applied to the acquired pre-stack seismic data and the simulation result obtained from the source wavelet and the velocity model in order to generate low-frequency information. Application of Equation 1 produces two modified data sets using a time-delayed signal. A first modified data set corresponds to the acquired pre-stack seismic data modified using the time-delayed signal, and second data set corresponds to the modeled seismic data obtained from the initial or updated velocity model and the initial or updated source wavelet. The convolution process may then be applied to both of the time-delayed data sets.

The iterative loop 408 begins at step 405. This iterative loop operates to reduce a residual energy between the modified modeled pre-stack seismic data (obtained using the time-delayed signal) and the modified acquired pre-stack seismic data (also obtained using the time-delayed signal). Again, in some implementations, a convolution process may also be applied to these modified data sets to further enhance the low-frequency information. In some implementations, the residual energy may be reduced or minimized. For example, a result (for example, a residual energy) is minimized when the result meets a selected value or is within a predetermined range. For example, the residual energy may be minimized when the residual energy is decreased to or less than a selected value; when the residual energy is no longer decreasing; or when a rate of decrease of the residual energy is at or less than a selected rate. With the time-delayed signals generated, an objective function is utilized to calculate the residual energy at 410. In this example, an objective function for full waveform inversion is used to determine the residual energy and update a direction (for example, increasing or decreasing) or rate in which the velocity data of the velocity model is to be changed. Updating the direction, or rate, or both of the velocity data contained in the velocity model is accomplished by taking a partial derivative of the objective function with respect to velocity. This partial derivative provides an indication of a direction of movement of the velocity, which is used to make adjustments to the velocity model prior to the next iterative loop. This objective function utilizes the time-delayed data sets obtained at 406 to determine the residual energy. This objective function, identified as Equation 2, is as follows:

$$E = \tfrac{1}{2} \sum_{ns} \sum_{nr} \int \| f_i * (\sqrt{u(t)^2 + u(t-t_d)^2}) - f_i * (\sqrt{d(t)^2 + d(t-t_d)^2}) \|_2 dt,$$

$$E = \tfrac{1}{2} \sum_{ns} \sum_{nr} \int \|r\|_2 dt, \qquad \text{Equation 2}$$

where u(t) is the modeled wavelet, d(t) is the acquired pre-stack seismic data, $f_i$ is a wavelet for the convolution of data, r is the residual energy between the modeled time-delayed convolved data and the time-delayed acquired seismic data, ns is the number of sources, and nr is the number of receivers. Again, in the example described earlier using the Marmousi velocity model data, the acquired seismic data corresponds to the data obtained from the Marmousi velocity model data. In real-world scenarios, the acquired seismic data is seismic data acquired in the field.

The wavelet $f_i$ is convolved to a time-delayed signal and functions to boost or enhance the low-frequency information obtained through the time-delay signals generated at step 406. In this example, a Gaussian wavelet with a cutoff frequency of twelve hertz is used as the wavelet $f_i$. In other implementations, other types of wavelets, for example, a Ricker wavelet or the first derivative of the Gaussian wavelet, may be used. Step 406 generates a directional change in velocity, also called a gradient, by determining a difference between the time-delayed modeled seismic data and the observed time-delayed seismic data. The source wavelet and the velocity model are updated using source estimation algorithm and the determined gradient, respectively. A gradient direction of the previously shown Equation 2 is derived by taking a partial derivative of Equation 2 with respect to a model parameter, m, which, in this case, is velocity. The partial derivative of Equation 2 forms Equation 3, as follows:

$$\frac{dE}{dm} = \qquad\qquad \text{Equation 3}$$

$$\sum_{ns}\sum_{nr} \int f_i * \frac{1}{2\left(\sqrt{u(t)^2+u(t-t_d)^2}\right)} \frac{d\left(u(t)^2+u(t-t_d)^2\right)}{dm} r\, dt$$

$$\frac{dE}{dm} = \sum_{ns}\sum_{nr} \int f_i * \frac{1}{\left(\sqrt{u(t)^2+u(t-t_d)^2}\right)}$$

$$\left(u(t)\frac{du(t)}{dm} + u(t-t_d)\frac{du(t-t_d)}{dm}\right) r\, dt$$

$$\frac{dE}{dm} = \sum_{ns}\sum_{nr} \int \frac{1}{\left(\sqrt{u(t)^2+u(t-t_d)^2}\right)}$$

$$\left(u(t)\frac{du(t)}{dm} + u(t-t_d)\frac{du(t-t_d)}{dm}\right) r'\, dt,$$

where $r' = -f_i \otimes r$ and $\otimes$ denotes cross-correlation. In Equation 3, the convolution term can be replaced by the cross-correlation term with the residual. In this formulation, the cross-correlation of the residual and $f_i$ are back-propagated.

Thus, at step 410, at each iterative step, a residual energy between the convolved and modified modeled data and the convolved and modified acquired seismic data is reduced. At 412, a determination is made as to whether to repeat the iterative cycle and return to 406. When a new iterative loop is determined at 412, the source wavelet and the velocity model are updated at 414. A source estimation procedure is performed, and the velocity of the velocity model and the convolved wavelet are updated using the gradient direction as shown in Equation 3. This iterative process may continue based on one or more of the following conditions. For example, the iterative loop may be repeated until the residual energy is reduced to at or less than a selected value; until the residual energy is no longer decreasing; until the residual energy is decreasing at a rate less than a selected rate; or a selected number of iterative loops 408 has been accomplished.

When a new iterative loop 408 is determined at 412, the source wavelet and velocity model are updated at 414. The velocity model is updated with the computed gradient direction using the following relationship:

$$m^{i+1} = m^i + \alpha \frac{dE}{dm},$$

where m is a model parameter (for example, velocity); α is a step length for updating the model values and $$\frac{dE}{dm}$$

is the value for the partial derivative of the objective function with respect to the velocity model. With new starting values for the velocity model and source wavelet, the iteration restarts and the iterative loops 408 continues until a decision at 412 stops the iteration cycles. When 412 determines that no additional iterative cycles are needed, the resulting velocity model is determined to be optimized. For example, a result (for example, a resulting velocity model) is optimized when the result meets or is within a predefined threshold. For example, in some implementations, a result is optimized when the result equals a predefined value, is less than a predefined value, is greater than a predefined value, or is within a predefined range of values. The method 400 then proceeds to 416 where a full waveform inversion is applied to the optimized velocity model to generate an inverted velocity model of the subterranean formations. The produced inverted velocity model provides a long wavelength velocity model that is usable as a starting model for the full waveform inversion. Importantly, because the inverted velocity model was generated using data containing low-frequency information, the full waveform inversion recovers subterranean formation detail that would otherwise be unavailable in the absence of the low-frequency information.

Figure 5A:
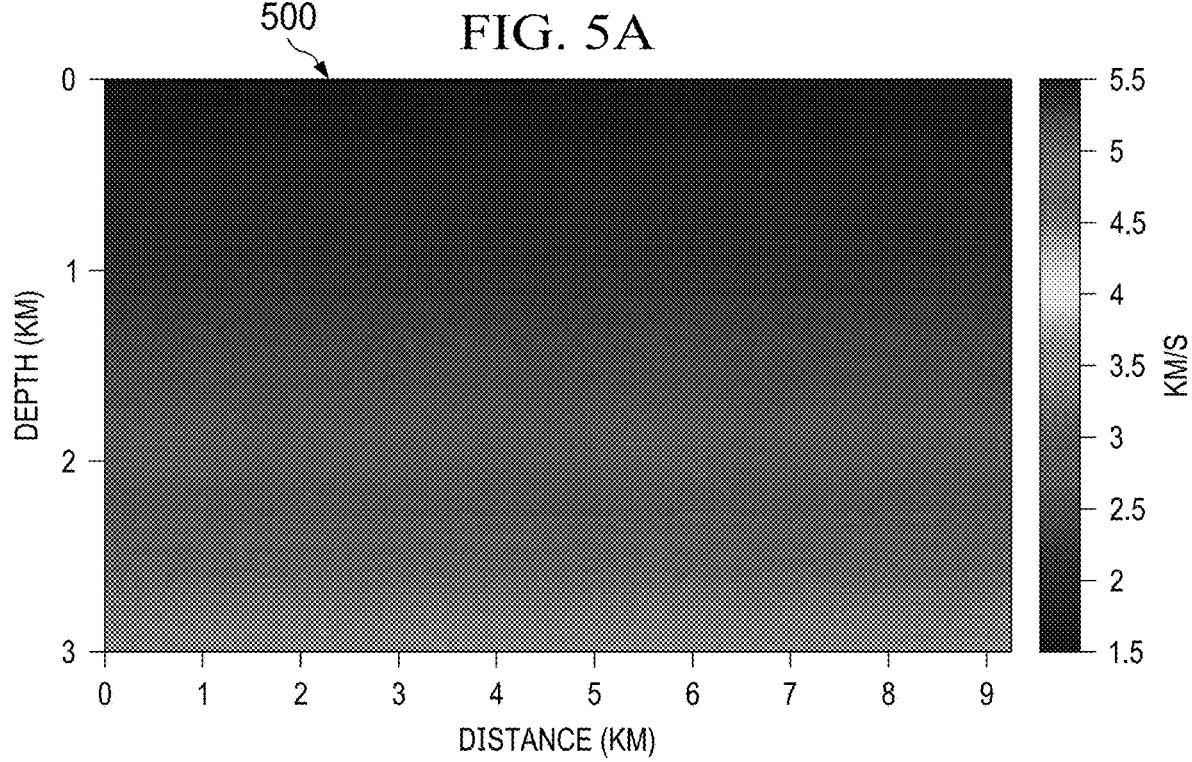
FIG. 5A is a starting velocity model. Low-frequency information is absent in the acquired data.
Figure 5B:
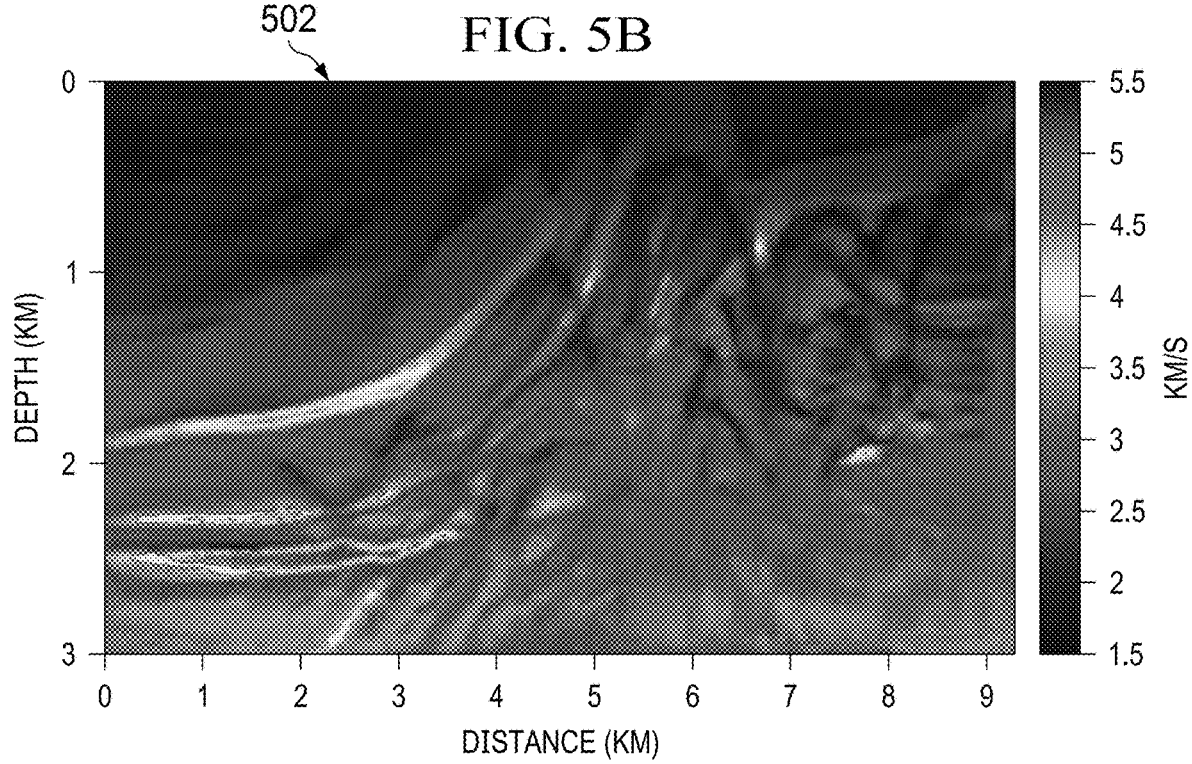
FIG. 5B is an inverted velocity model obtained using a full waveform inversion using the acquired data lacking of low-frequency information started from the velocity model of FIG. 5A.

By generating the low-frequency information using the time delay function of Equation 1, full waveform inversion process is operable to generate a long wavelength velocity model. FIG. 5A illustrates a starting velocity model 500 that lacks long wavelength subterranean formations. In this example, the velocity model 500 is a linearly increasing velocity model from 1.5 kilometers per second to 3.0 kilometers per second. FIG. 5B illustrates the corresponding velocity model 502 obtained when full waveform inversion is applied to the starting velocity model 500 with the acquired data that lacks low-frequency information. As shown, the resulting velocity model 502 does not accurately represent the subterranean formations.

Figure 6A:
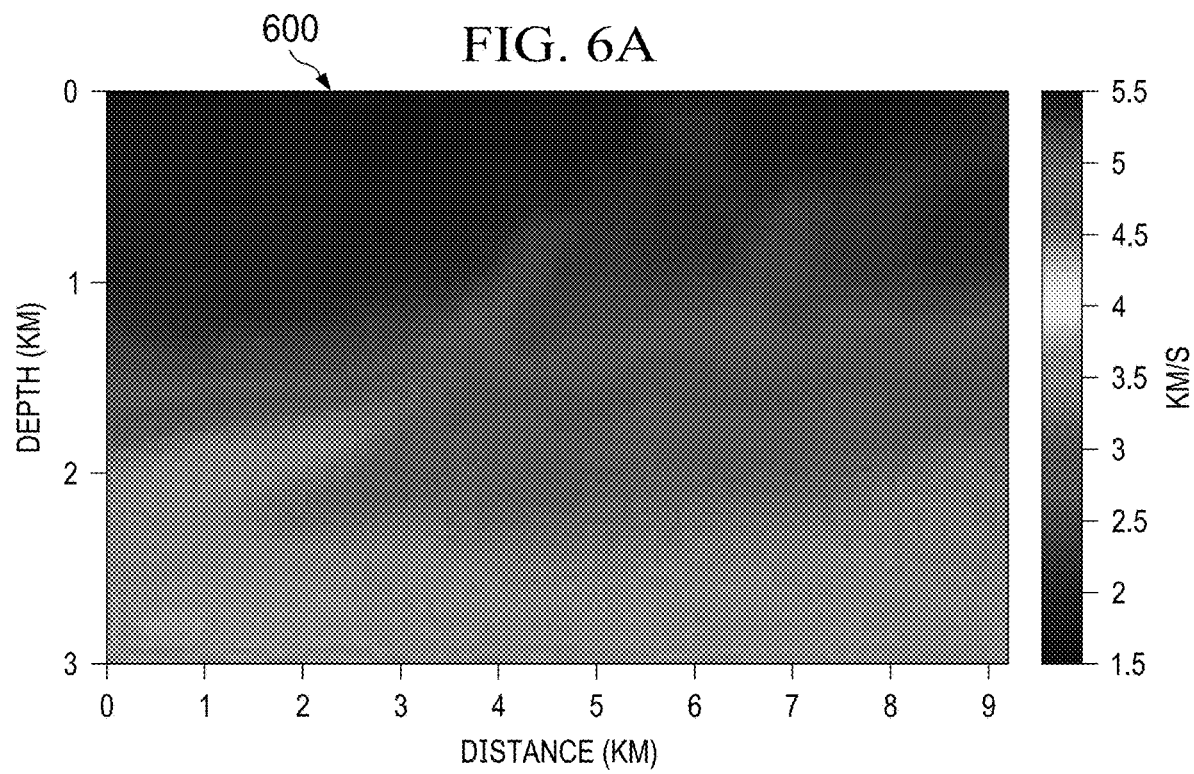
FIG. 6A is an optimized starting velocity model that includes long wavelength subterranean formations that are obtained using a full waveform inversion using a time-delayed signal containing artificial low frequency information, according to some implementations of the present disclosure.
Figure 6B:
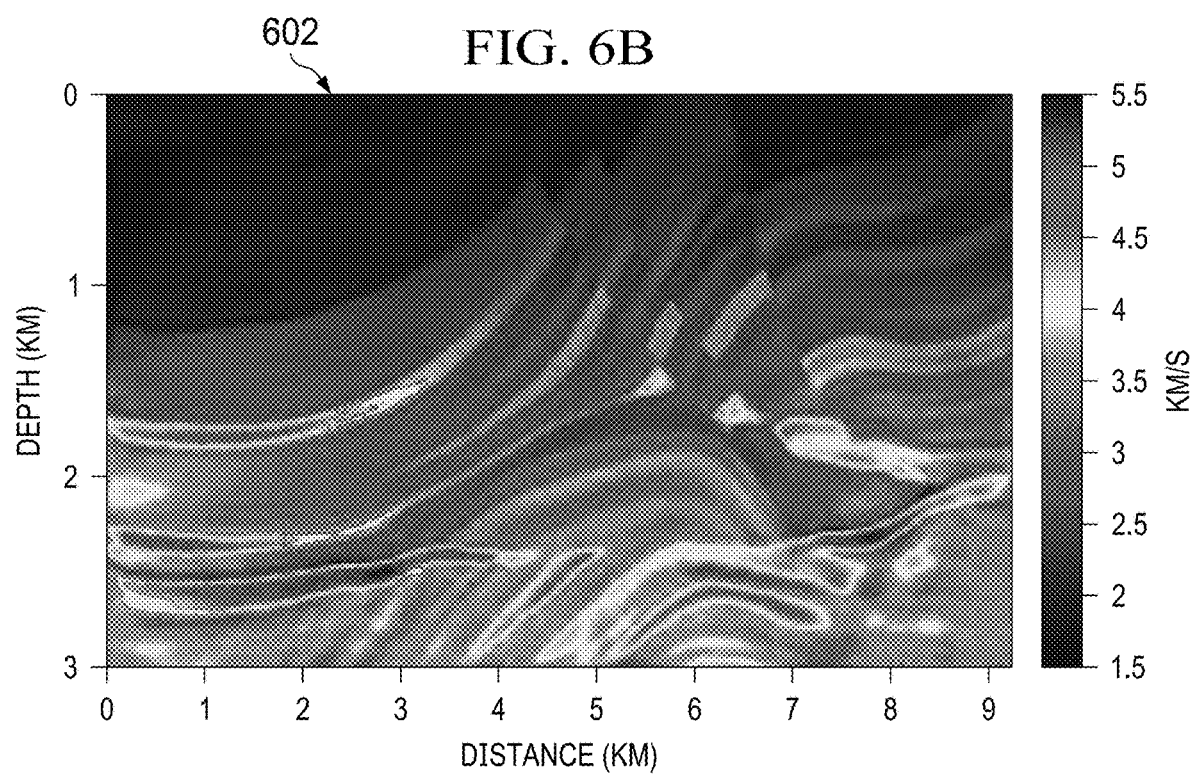
FIG. 6B is an inverted velocity model obtained using a full waveform inversion using the acquired data lacking low-frequency information started from the velocity model of FIG. 6A.

FIG. 6A, on the other hand, illustrates an optimized staring velocity model 600 that is computed using full waveform inversion with artificial low-frequency information obtained using the time delay function of Equation 1. FIG. 6B shows the corresponding velocity model 602 obtained when full waveform inversion is applied to the optimized starting velocity model 600 that includes the long wavelength subterranean formations with the acquired data that lacks low-frequency information. As shown, the velocity model 602 is an improvement over the velocity model 502 and more accurately represents the subterranean formations.

Figure 7:
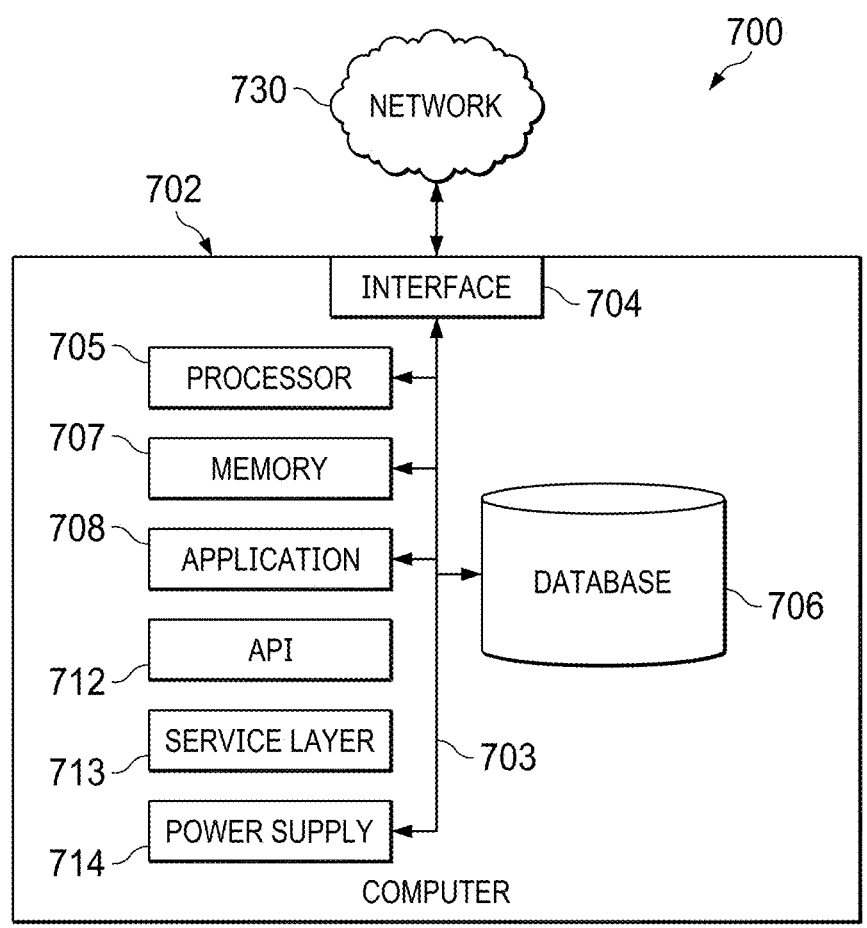
FIG. 7 is a block diagram illustrating an example computer system used to provide computational functionalities associated with described algorithms, methods, functions, processes, flows, and procedures as described in the present disclosure, according to some implementations of the present disclosure.

FIG. 7 is a block diagram of an example computer system 700 used to provide computational functionalities associated with described algorithms, methods, functions, processes, flows, and procedures described in the present disclosure, according to some implementations of the present disclosure. The illustrated computer 702 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 702 can include input devices such as keypads, keyboards, and touch screens that can accept user information. Also, the computer 702 can include output devices that can convey information associated with the operation of the computer 702. The information can include digital data, visual data, audio information, or a combination of information. The information can be presented in a graphical user interface (UI) (or GUI).

The computer 702 can serve in a role as a client, a network component, a server, a database, a persistency, or components of a computer system for performing the subject matter described in the present disclosure. The illustrated computer 702 is communicably coupled with a network 730. In some implementations, one or more components of the computer 702 can be configured to operate within different environments, including cloud-computing-based environments, local environments, global environments, and combinations of environments.

At a high level, the computer 702 is an electronic computing device operable to receive, transmit, process, store, and manage data and information associated with the described subject matter. According to some implementations, the computer 702 can also include, or be communicably coupled with, an application server, an email server, a web server, a caching server, a streaming data server, or a combination of servers.

The computer 702 can receive requests over network 730 from a client application (for example, executing on another computer 702). The computer 702 can respond to the received requests by processing the received requests using software applications. Requests can also be sent to the computer 702 from internal users (for example, from a command console), external (or third) parties, automated applications, entities, individuals, systems, and computers.

Each of the components of the computer 702 can communicate using a system bus 703. In some implementations, any or all of the components of the computer 702, including hardware or software components, can interface with each other or the interface 704 (or a combination of both), over the system bus 703. Interfaces can use an application programming interface (API) 712, a service layer 713, or a combination of the API 712 and service layer 713. The API 712 can include specifications for routines, data structures, and object classes. The API 712 can be either computer-language independent or dependent. The API 712 can refer to a complete interface, a single function, or a set of APIs.

The service layer 713 can provide software services to the computer 702 and other components (whether illustrated or not) that are communicably coupled to the computer 702. The functionality of the computer 702 can be accessible for all service consumers using this service layer. Software services, such as those provided by the service layer 713, can provide reusable, defined functionalities through a defined interface. For example, the interface can be software written in JAVA, C++, or a language providing data in extensible markup language (XML) format. While illustrated as an integrated component of the computer 702, in alternative implementations, the API 712 or the service layer 713 can be stand-alone components in relation to other components of the computer 702 and other components communicably coupled to the computer 702. Moreover, any or all parts of the API 712 or the service layer 713 can be implemented as child or sub-modules of another software module, enterprise application, or hardware module without departing from the scope of the present disclosure.

The computer 702 includes an interface 704. Although illustrated as a single interface 704 in FIG. 7, two or more interfaces 704 can be used according to particular needs, desires, or particular implementations of the computer 702 and the described functionality. The interface 704 can be used by the computer 702 for communicating with other systems that are connected to the network 730 (whether illustrated or not) in a distributed environment. Generally, the interface 704 can include, or be implemented using, logic encoded in software or hardware (or a combination of software and hardware) operable to communicate with the network 730. More specifically, the interface 704 can include software supporting one or more communication protocols associated with communications. As such, the network 730 or the interface's hardware can be operable to communicate physical signals within and outside of the illustrated computer 702.

The computer 702 includes a processor 705. Although illustrated as a single processor 705 in FIG. 7, two or more processors 705 can be used according to particular needs, desires, or particular implementations of the computer 702 and the described functionality. Generally, the processor 705 can execute instructions and can manipulate data to perform the operations of the computer 702, including operations using algorithms, methods, functions, processes, flows, and procedures as described in the present disclosure.

The computer 702 also includes a database 706 that can hold data for the computer 702 and other components connected to the network 730 (whether illustrated or not). For example, database 706 can be an in-memory, conventional, or a database storing data consistent with the present disclosure. In some implementations, database 706 can be a combination of two or more different database types (for example, hybrid in-memory and conventional databases) according to particular needs, desires, or particular implementations of the computer 702 and the described functionality. Although illustrated as a single database 706 in FIG. 7, two or more databases (of the same, different, or combination of types) can be used according to particular needs, desires, or particular implementations of the computer 702 and the described functionality. While database 706 is illustrated as an internal component of the computer 702, in alternative implementations, database 706 can be external to the computer 702.

The computer 702 also includes a memory 707 that can hold data for the computer 702 or a combination of components connected to the network 730 (whether illustrated or not). Memory 707 can store any data consistent with the present disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707 in FIG. 7, two or more memories 707 (of the same, different, or combination of types) can be used according to particular needs, desires, or particular implementations of the computer 702 and the described functionality. While memory 707 is illustrated as an internal component of the computer 702, in alternative implementations, memory 707 can be external to the computer 702.

The application 708 can be an algorithmic software engine providing functionality according to particular needs, desires, or particular implementations of the computer 702 and the described functionality. For example, application 708 can serve as one or more components, modules, or applications. Further, although illustrated as a single application 708, the application 708 can be implemented as multiple applications 708 on the computer 702. In addition, although illustrated as internal to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion and management circuits, including recharging, standby, and power management functionalities. In some implementations, the power-supply 714 can include a power plug to allow the computer 702 to be plugged into a wall socket or a power source to, for example, power the computer 702 or recharge a rechargeable battery.

There can be any number of computers 702 associated with, or external to, a computer system containing computer 702, with each computer 702 communicating over network 730. Further, the terms "client," "user," and other appropriate terminology can be used interchangeably, as appropriate, without departing from the scope of the present disclosure. Moreover, the present disclosure contemplates that many users can use one computer 702 and one user can use multiple computers 702.

Described implementations of the subject matter can include one or more features, alone or in combination.

For example, in a first implementation, a computer-implemented method for automatically generating a long wavelength velocity model that more accurately represents subterranean formations the method including: receiving a set of seismic data; receiving an initial velocity model and an initial source wavelet, the initial velocity model being a user-selected velocity model and the initial source wavelet being a user-selected wavelet; performing a wavefield simulation using the initial source wavelet and the initial velocity model to generate modeled seismic data; converting the received set of observed seismic data into a first time-delayed signal; converting modeled seismic data into a second time-delayed signal; optimizing the initial velocity model utilizing the first time-delayed signal and the second time-delayed signal; and performing a full waveform inversion on the initial velocity model to produce an optimized initial velocity model containing long wavelength subterranean formations that more accurately represents subterranean formations.

The foregoing and other described implementations can each, optionally, include one or more of the following features:

A first feature, combinable with any of the following features, wherein optimizing the initial velocity model containing long wavelength subterranean formations using full waveform inversion utilizing the first time-delayed signal and the second time-delayed signal comprises reducing a residual energy between the first time-delayed signal and the second time-delayed signal.

A second feature, combinable with any of the previous or following features, wherein reducing a residual energy between the first time-delayed signal and the second time-delayed signal includes applying an objective function to the first time-delayed signal and the second time-delayed signal to determine the residual energy; determining whether the residual energy satisfies a predetermined condition; and if the residual energy does not meet the predetermined condition, repeating an iterative loop until the occurrence of the predetermined condition or until a selected number of iterative loops is completed, the iterative loop including: taking a partial derivative of the objective function with respect to velocity to determine a directional change of the velocity; updating the initial velocity model according to the determined directional change of velocity to form a new velocity model; updating the initial source wavelet via a source estimation algorithm by minimizing a difference between a modeled green-function and the received set of observed data to form a new source wavelet; performing a wavefield simulation with the new source wavelet and the new velocity model to generate new modeled seismic data; converting the received set of observed seismic data into a new first time-delayed signal; converting the new modeled seismic data into a new second time-delayed signal; applying the objective function to the new first time-delayed signal and the new second time-delayed signal to determine the residual energy; and determining whether the new residual energy satisfies the predetermined condition.

A third feature, combinable with any of the previous or following features, wherein the predetermined condition includes a condition in which the residual energy is decreased to or less than a selected value; a condition in which the residual energy is no longer decreasing; or a condition in which a rate of decrease of the residual energy is at or less than a selected rate.

A fourth feature, combinable with any of the previous or following features, wherein the source wavelet is a Gaussian wavelet, a Ricker wavelet, or a first derivative of a Gaussian wavelet.

A fifth feature, combinable with any of the previous or following features, wherein performing a full waveform inversion to produce an optimized initial velocity model containing long wavelength subterranean formations using modified acquired data and performing a full waveform inversion on the optimized initial velocity model using acquired data to produce a velocity model more accurately representing subterranean formations.

In a second implementation, a non-transitory, computer-readable medium storing one or more instructions executable by a computer system to perform operations including: receiving a set of observed seismic data; receiving an initial velocity model and an initial source wavelet, the initial velocity model being a user-selected velocity model and the initial source wavelet being a user-selected wavelet; performing a wavefield simulation using the initial source wavelet and the initial velocity model to generate modeled seismic data; converting the received set of observed seismic data into a first time-delayed signal; converting the modeled seismic data into a second time-delayed signal; optimizing the initial velocity model utilizing the first time-delayed signal and the second time-delayed signal; and performing a full waveform inversion on the optimized initial velocity model to produce a long wavelength velocity model that more accurately represents subterranean formations.

The foregoing and other described implementations can each, optionally, include one or more of the following features:

A first feature, combinable with any of the following features, wherein optimizing the initial velocity model containing long wavelength subterranean formations using full waveform inversion utilizing the first time-delayed signal and the second time-delayed signal includes reducing a residual energy between the first time-delayed signal and the second time-delayed signal.

A second feature, combinable with the previous or following features, wherein reducing a residual energy between the first time-delayed signal and the second time-delayed signal includes applying an objective function to the first time-delayed signal and the second time-delayed signal to determine the residual energy; determining whether the residual energy satisfies a predetermined condition; and if the residual energy does not meet the predetermined condition, repeating an iterative loop until the occurrence of the predetermined condition or until a selected number of iterative loops is completed, the iterative loop including: taking a partial derivative of the objective function with respect to velocity to determine a directional change of the velocity; updating the initial velocity model according to the determined directional change of velocity to form a new velocity model; updating the initial source wavelet via a source estimation algorithm by minimizing a difference between a modeled green-function and the received set of observed seismic data to form a new source wavelet; performing a wavefield simulation with the new source wavelet and the new velocity model to generate new modeled seismic data; converting the received set of observed data set into a new first time-delayed signal; converting the new modeled seismic data into a new second time-delayed signal; applying the objective function to the new first time-delayed signal and the new second time-delayed signal to determine the residual energy; and determining whether the new residual energy satisfies the predetermined condition.

A third feature, combinable with the previous or following features, wherein the predetermined condition may include a condition in which the residual energy is decreased to or less than a selected value; a condition in which the residual energy is no longer decreasing; or a condition in which a rate of decrease of the residual energy is at or less than a selected rate.

A fourth feature, combinable with the previous or following features, wherein the source wavelet is a Gaussian wavelet, a Ricker wavelet, or a first derivative of a Gaussian wavelet.

A fifth feature, combinable with any of the previous or following features, wherein performing a full waveform inversion to produce an optimized initial velocity model containing long wavelength subterranean formations using modified acquired data and performing a full waveform inversion on the optimized initial velocity model using acquired data to produce a velocity model more accurately representing subterranean formations.

In a third implementation, a computer-implemented system for generating a long wavelength velocity model that more accurately represents subterranean formations, the system including one or more processors and a non-transitory computer-readable storage medium coupled to the one or more processors and storing programming instructions for execution by the one or more processors, the programming instructions instructing the one or more processors to: receive a set of observed seismic data; receive an initial velocity model and an initial source wavelet, the initial velocity model being a user-selected velocity model and the initial source wavelet being a user-selected wavelet; perform a wavefield simulation using the initial source wavelet and the initial velocity model to generate modeled seismic data; convert the received set of observed seismic data into a first time-delayed signal; convert the modeled seismic data into a second time-delayed signal; optimize the initial velocity model utilizing the first time-delayed signal and the second time-delayed signal; and perform a full waveform inversion on the optimized initial velocity model to produce a long wavelength velocity model that more accurately represents subterranean formations The foregoing and other described implementations can each, optionally, include one or more of the following features:

A first feature, combinable with any of the following features, wherein optimizing the initial velocity model containing long wavelength subterranean formations using full waveform inversion utilizing the first time-delayed signal and the second time-delayed signal comprises reducing a residual energy between the first time-delayed signal and the second time-delayed signal.

A second feature, combinable with any of the previous or following features, wherein the programming instructions for instructing the one or more processors to reduce a residual energy between the first time-delayed signal and the second time-delayed signal comprises programming instructions for instructing the one or more processors to: apply an objective function to the first time-delayed signal and the second time-delayed signal to determine the residual energy; determine whether the residual energy satisfies a predetermined condition; and if the residual energy does not meet the predetermined condition, repeating an iterative loop until the occurrence of the predetermined condition or until a selected number of iterative loops is completed, the iterative loop including: taking a partial derivative of the objective function with respect to velocity to determine a directional change of the velocity; updating the initial velocity model according to the determined directional change of velocity to form a new velocity model; updating the initial source wavelet via a source estimation algorithm by minimizing a difference between a modeled green-function and the received set of observed seismic data to form a new source wavelet; performing a wavefield simulation with the new source wavelet and the new velocity model to generate new modeled seismic data; converting the received set of observed seismic data into a new first time-delayed signal; converting the new modeled seismic data into a new first time-delayed signal; applying the objective function to the new first time-delayed signal and the new second time-delayed signal to determine a new residual energy; and determining whether the new residual energy satisfies the predetermined condition.

A third feature, combinable with any of the previous or following features, wherein the predetermined condition includes a condition in which the residual energy is decreased to or less than a selected value; a condition in which the residual energy is no longer decreasing; or a condition in which a rate of decrease of the residual energy is at or less than a selected rate.

A fourth feature, combinable with any of the previous or following features, wherein the source wavelet is a Gaussian wavelet, a Ricker wavelet, or a first derivative of a Gaussian wavelet.

A fifth feature, combinable with any of the previous or following features, wherein performing a full waveform inversion to produce an optimized initial velocity model containing long wavelength subterranean formations using modified acquired data and performing a full waveform inversion on the optimized initial velocity model using acquired data to produce a velocity model more accurately representing subterranean formations.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as standalone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/nonvolatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/-R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of the present disclosure have been described. Nevertheless, it will be understood that various modifications may be made without departing from the spirit and scope of the present disclosure. Accordingly, other embodiments are within the scope of the following claims.

What is claimed is:

1. A computer program product encoded on a non-transitory medium, the product comprising computer readable instructions for causing one or more processors to perform operations comprising:
    receiving a set of observed seismic data;
    receiving an initial velocity model and an initial source wavelet, the initial velocity model being a user-selected velocity model and the initial source wavelet being a user-selected wavelet;
    performing a wavefield simulation using the initial source wavelet and the initial velocity model to generate modeled seismic data;
    converting the received set of observed seismic data into a first time-delayed signal;
    converting the modeled seismic data into a second time-delayed signal;
    optimizing the initial velocity model containing long wavelength subterranean formations using a full waveform inversion utilizing the first time-delayed signal and the second time-delayed signal; and
    performing a full waveform inversion utilizing observed data and modeled data on the optimized initial velocity model to produce a detailed velocity model that more accurately represents subterranean formations;
    wherein optimizing the initial velocity model containing long wavelength subterranean formations using a full waveform inversion utilizing the first time-delayed signal and the second time-delayed signal comprises reducing a residual energy between the first time-delayed signal and the second time-delayed signal; and
    wherein reducing a residual energy between the first time-delayed signal and the second time-delayed signal comprises:
        applying an objective function to the first time-delayed signal and the second time-delayed signal to determine the residual energy;
        determining whether the residual energy satisfies a predetermined condition; and
        if the residual energy does not meet the predetermined condition, repeating an iterative loop until an occurrence of the predetermined condition or until a selected number of iterative loops is completed, the iterative loop comprising:
            taking a partial derivative of the objective function with respect to velocity to determine a directional change of the velocity;
            updating the initial velocity model according to the determined directional change of velocity to form a new velocity model;
            updating the initial source wavelet via a source estimation algorithm by minimizing a difference between a modeled green-function and the received set of observed seismic data forming a new source wavelet;
            performing a wavefield simulation with the new source wavelet and the new velocity model to generate new modeled seismic data;
            converting the received set of observed seismic data into a new first time-delayed signal;
            converting the new modeled seismic data into a new second time-delayed signal;
            applying the objective function to the new first time-delayed signal and the new second time-delayed signal to determine a new residual energy; and
            determining whether the new residual energy satisfies the predetermined condition.

2. The computer program product of claim 1, wherein performing a full waveform inversion utilizing modified data using time delayed signal on the initial velocity model to produce an optimized initial model contains long wavelength subterranean formations and performing a full waveform inversion utilizing acquired data on the optimized initial velocity model to produce detailed velocity model that more accurately represents subterranean formations.

3. The computer program product of claim 1, wherein the predetermined condition comprises:
    a condition in which the residual energy is decreased to or less than a selected value;
    a condition in which the residual energy is no longer decreasing; or
    a condition in which a rate of decrease of the residual energy is at or less than a selected rate.

4. The computer program product of claim 1, wherein the source wavelet is a Gaussian wavelet, a Ricker wavelet, or a first derivative of a Gaussian wavelet.

5. The computer program product of claim 1, wherein performing a full waveform inversion to produce an optimized initial velocity model containing long wavelength subterranean formations using modified acquired data and performing a full waveform inversion on the optimized initial velocity model using acquired data to produce a velocity model more accurately representing subterranean formations.

6. A computer implemented method performed by one or more processors for automatically generating a long wavelength velocity model that more accurately represents subterranean formations, the method comprising:
    receiving a set of observed seismic data;

receiving an initial velocity model and an initial source wavelet, the initial velocity model being a user-selected velocity model and the initial source being a user-selected wavelet;

performing a wavefield simulation using the initial source wavelet and the initial velocity model to generate modeled seismic data;

converting the received set of observed seismic data into a first time-delayed signal;

converting the modeled seismic data into a second time-delayed signal;

optimizing the initial velocity model containing long wavelength subterranean formations using full waveform inversion utilizing the first time-delayed signal and the second time-delayed signal; and performing a full waveform inversion utilizing observed data and modeled data on the optimized initial velocity model to produce a detailed velocity model that more accurately represents subterranean formations;

wherein optimizing the initial velocity model utilizing the first time-delayed signal and the second time-delayed signal comprises reducing a residual energy between the first time-delayed signal and the second time-delayed signal; and wherein reducing a residual energy between the first time-delayed signal and the second time-delayed signal comprises:

applying an objective function to the first time-delayed signal and the second time-delayed signal to determine the residual energy;

determining whether the residual energy satisfies a predetermined condition; and if the residual energy does not meet the predetermined condition, repeating an iterative loop until an occurrence of the predetermined condition or until a selected number of iterative loops is completed, the iterative loop comprising:

taking a partial derivative of the objective function with respect to velocity to determine a directional change of the velocity;

updating the initial velocity model according to the determined directional change of velocity to form a new velocity model;

updating the initial source wavelet via a source estimation algorithm by minimizing a difference between a modeled green-function and the received set of observed seismic data forming a new source wavelet;

performing a wavefield simulation with the new source wavelet and the new velocity model to generate new modeled seismic data;

converting the received set of observed seismic data into a new first time-delayed signal;

converting the new modeled seismic data into a new second time-delayed signal;

applying the objective function to the new first time-delayed signal and the new second time-delayed signal to determine a new residual energy; and determining whether the new residual energy satisfies the predetermined condition.

7. The computer implemented method of claim 6, wherein the predetermined condition comprises:

a condition in which the residual energy is decreased to or less than a selected value;

a condition in which the residual energy is no longer decreasing; or a condition in which a rate of decrease of the residual energy is at or less than a selected rate.

8. The computer implemented method of claim 6, wherein the source wavelet is a Gaussian wavelet, a Ricker wavelet, or a first derivative of a Gaussian wavelet.

9. The computer implemented method of claim 6, wherein performing a full waveform inversion to produce an optimized initial velocity model containing long wavelength subterranean formations using modified acquired data and performing a full waveform inversion on the optimized initial velocity model using acquired data to produce a velocity model more accurately representing subterranean formations.

10. An apparatus for generating a long wavelength velocity model that more accurately represents subterranean formations, the apparatus comprising:

one or more processors; and a non-transitory computer-readable storage medium coupled to the one or more processors and storing programming instructions for execution by the one or more processors, the programming instructions instruct the one or more processors to:

receive a set of observed seismic data;

receive an initial velocity model and an initial source wavelet, the initial velocity model being a user-selected velocity model and the initial source wavelet being a user-selected wavelet;

perform a wavefield simulation using the initial source wavelet and the initial velocity model to generate modeled seismic data;

convert the received set of observed seismic data into a first time-delayed signal;

convert modeled seismic data into a second time-delayed signal;

optimize the initial velocity model containing long wavelength subterranean formations using full waveform inversion utilizing the first time-delayed signal and the second time-delayed signal; and performing a full waveform inversion utilizing observed data and modeled data on the optimized initial velocity model to produce a detailed velocity model that more accurately represents subterranean formations;

reducing a residual energy between the first time-delayed signal and the second time-delayed signal; and wherein reducing a residual energy between the first time-delayed signal and the second time-delayed signal comprises:

applying an objective function to the first time-delayed signal and the second time-delayed signal to determine the residual energy;

determining whether the residual energy satisfies a predetermined condition; and if the residual energy does not meet the predetermined condition, repeat an iterative loop until an occurrence of the predetermined condition or until a selected number of iterative loops is completed, the iterative loop comprising:

taking a partial derivative of the objective function with respect to velocity to determine a directional change of the velocity;

updating the initial velocity model according to the determined directional change of velocity to form a new velocity model;

updating the initial source wavelet via a source estimation algorithm by minimizing a difference between a modeled green-function and the received set of observed seismic data forming a new source wavelet;

performing a wavefield simulation with the new source wavelet and the new velocity model to generate new modeled seismic data;

converting the received set of observed seismic data into a new first time-delayed signal;

converting the new modeled seismic data into a new second time-delayed signal;

applying the objective function to the new first time-delayed signal and the new second time-delayed signal to determine a new residual energy; and determining whether the new residual energy satisfies the predetermined condition.

11. The apparatus of claim 10, wherein the predetermined condition comprises:

a condition in which the residual energy is decreased to or less than a selected value;

a condition in which the residual energy is no longer decreasing; or a condition in which a rate of decrease of the residual energy is at or less than a selected rate.

12. The apparatus of claim 10, wherein the source wavelet is a Gaussian wavelet, a Ricker wavelet, or a first derivative of a Gaussian wavelet.

13. The apparatus of claim 10, wherein the programming instructions for instructing the one or more processors to perform a full waveform inversion to produce an optimized initial velocity model containing long wavelength subterranean formations using modified acquired data and comprises programming instructions for instructing the one or more processors to perform a full waveform inversion on the optimized initial velocity model using acquired data to produce a velocity model more accurately representing subterranean formations.

* * * * *